United States Patent
Dickerhoof et al.

(10) Patent No.: US 8,253,269 B2
(45) Date of Patent: Aug. 28, 2012

(54) ECONOMIZER FOR VEHICLE BATTERY DISCONNECT

(75) Inventors: Greg Dickerhoof, Ann Arbor, MI (US); Aric Henderson Anglin, Rives Junctions, MI (US); Jose Gabriel Fernandez Banares, Valls (ES)

(73) Assignee: Lear Corporation, Southfield, MI (US)

( * ) Notice: Subject to any disclaimer, the term of this patent is extended or adjusted under 35 U.S.C. 154(b) by 316 days.

(21) Appl. No.: 12/778,607

(22) Filed: May 12, 2010

(65) Prior Publication Data

US 2011/0075315 A1   Mar. 31, 2011

Related U.S. Application Data

(60) Provisional application No. 61/245,790, filed on Sep. 25, 2009.

(51) Int. Cl.
*H02H 7/18* (2006.01)

(52) U.S. Cl. ..................................... 307/10.7; 361/190

(58) Field of Classification Search ............... 307/10.7
See application file for complete search history.

(56) References Cited

U.S. PATENT DOCUMENTS

| | | | |
|---|---|---|---|
| 3,781,651 A | | 12/1973 | Heidel |
| 5,466,998 A | * | 11/1995 | Kinoshita et al. ............. 318/375 |
| 6,424,511 B1 | | 7/2002 | Levinas |
| 6,492,745 B1 | | 12/2002 | Colley, III et al. |
| 8,103,396 B2 | * | 1/2012 | Mitsutani ........................ 701/22 |
| 2009/0147427 A1 | | 6/2009 | Levinas et al. |
| 2009/0212634 A1 | * | 8/2009 | Kojima et al. ................... 307/77 |
| 2010/0214055 A1 | * | 8/2010 | Fuji et al. ........................ 340/3.1 |

FOREIGN PATENT DOCUMENTS

GB            473137         10/1937

* cited by examiner

*Primary Examiner* — Rexford N Barnie
*Assistant Examiner* — Toan Vu
(74) *Attorney, Agent, or Firm* — Brooks Kushman P.C.

(57) ABSTRACT

An economizer configured to connected coils in series and in parallel with a voltage source in order to facilitate pulling relays to a closed position, and thereafter, holding the relays in the closed position while reducing a voltage applied across the coils.

4 Claims, 1 Drawing Sheet

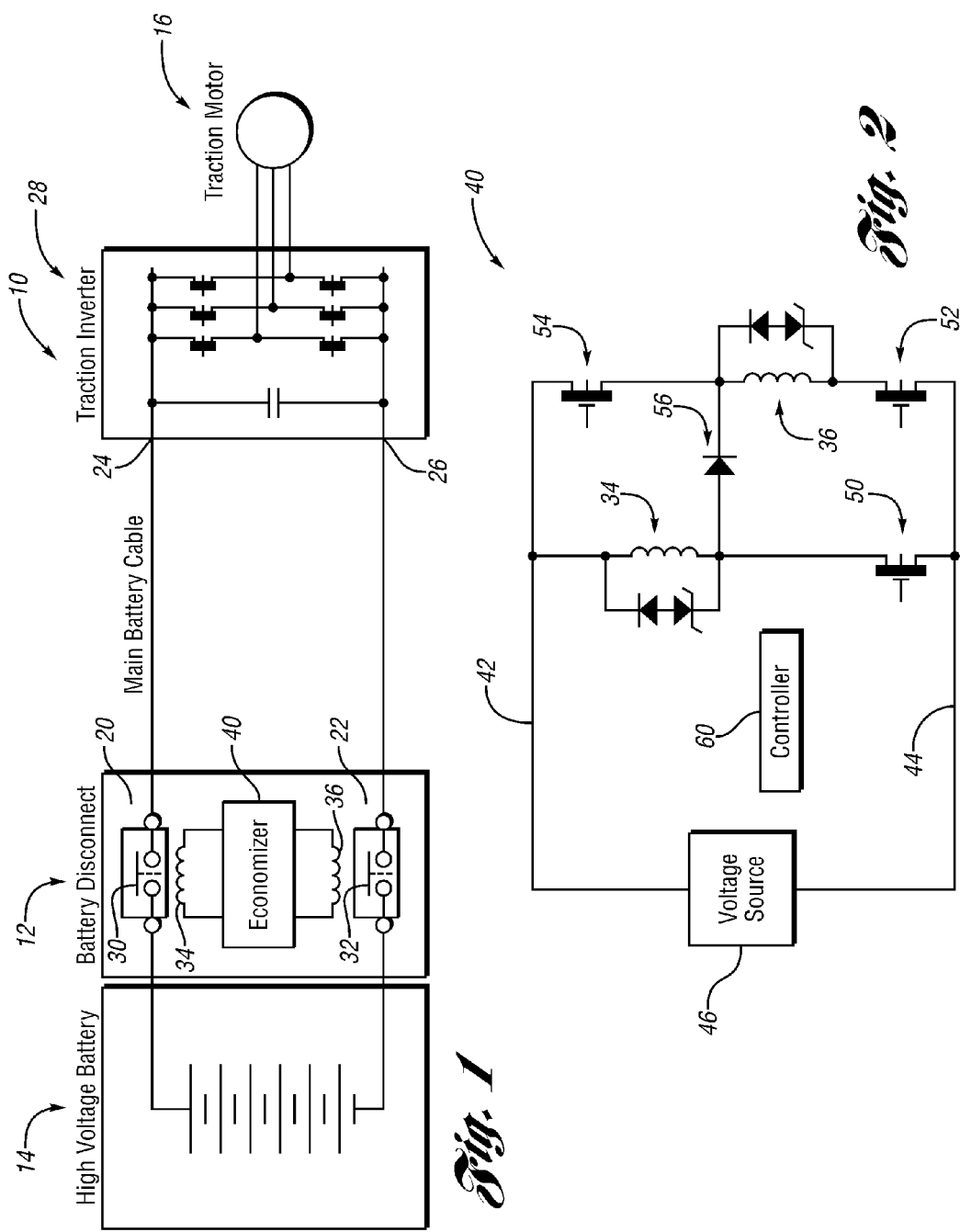

US 8,253,269 B2

ECONOMIZER FOR VEHICLE BATTERY DISCONNECT

CROSS-REFERENCE TO RELATED APPLICATIONS

This application claims the benefit of U.S. provisional Application No. 61/245,790 filed Sep. 25, 2009. The disclosure of which is incorporated in its entirety by reference herein.

TECHNICAL FIELD

The present invention relates to an economizer configured to facilitate disconnecting a vehicle system from a vehicle battery, such as but not limited an economizer suitable for use in an electric or hybrid electric vehicle requiring disconnect of traction motor from a high voltage battery.

BACKGROUND

An economizer may include a coil or other magnetic field generating element to attract a relay from a normally open position to a closed position. An amount of current required to attract the relay depends on the size of the relay, which is generally proportional to an amount of current traveling therethrough. As such, the amount of current required to power the coil can vary depending on the size of the relay. Coils operable to attract relays used to connect high voltage batteries, i.e., batteries having voltages in the range of 250-550 VDC, typically require a greater amount of current than coils operable to attract relays used to connect lower voltage batteries, i.e., batteries having voltage in the range of 0-30 VDC. The increased current requires the coils to be larger in order to generate sufficient magnetic forces, which can have an undesirable, heat generation side effect. This can be problematic at least in so far as requiring larger packaging designs and more costly components.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a battery disconnect system in accordance with one non-limiting aspect of the present invention; and FIG. 2 illustrates the economizer in accordance with one non-limiting aspect of the present invention.

DETAILED DESCRIPTION

FIG. 1 illustrates a battery disconnect system 10 in accordance with one non-limiting aspect of the present invention. The system 10 is described predominately with respect to a battery disconnect 12 supporting battery disconnect within an electric vehicle or hybrid electric vehicle of the type where a battery 14 is used to provide energy to a traction motor 16. This description is provided for exemplary purposes only, and unless otherwise noted, is not intended to limit the scope and contemplation of the present invention. The present invention fully contemplates its application in non-vehicle or non-automotive applications, such as but not limited to any other application that requires the actuation of at least two relays/switches at the same time (e.g., DC/DC stabilizer).

The battery disconnect 12 may include positive and negative terminals 20, 22 for providing energy to positive and negative terminals 24, 26 of a traction inverter 28 configured to power the traction motor 16 (the traction inverter 28 may be standalone element and/or integrated with the traction motor 16). Positive and negative 30, 32 relays may be respectively included between the positive and negative terminals 20, 22, 24, 26 to control the flow of current therebetween. The relays 30, 32 may be operable between open and closed positions to respectively prohibit and permit the flow of current between the terminals 20, 22, 24, 26. In the case of the battery 14 being a high voltage battery, the relays 30, 32 may be of the larger type required to support the higher current demands and/or the higher voltages generated by batteries for Electric or Hybrid vehicles.

The relays 30, 32 may be continuously biased to the open position with a spring or other biasing element (not shown) such that a magnetic field may be required in order to actuate (attract) the relays 30, 32 from the open position to the closed position. The battery disconnect 12 may include first and second coils 34, 36 to respectively actuate the positive and negative relays 30, 32 from the open position to the closed position. The current used to drive the coils 34, 36 may be provided by an economizer 40. The economizer 40 may be operable to provide each of the coils 34, 36 with varying amounts of current depending on the desired positioning of the relays 30, 32. In this manner, one or more of the coils 34, 36 may be controlled at the same time to actuate one or more of the relays 30, 32 from the open position to the closed position. Thereafter, the relays 30, 32 may be maintained in the closed position with a reduced amount of current being provided to one or both of the coils 34, 36.

The ability to reduce the amount of current provided to the coils 34, 36 can be helpful in limiting the power consumption of the system and the amount of heat generated. This reduction of current, however, may be limited to situations in which the relays 30, 32 are of the type that require less energy when being held in the closed position than when being pulled to the closed position. The economizer 40 may be configured to provide a holding voltage across each coil 34, 36 in order to provide the current necessary to maintain the respective relay 30, 32 in the closed position and a pull-in voltage across each coil 34, 36 in order to provide the current necessary to actuate respective relays 30, 32 from the open position to the closed position. In some cases, the holding and pull-in voltages may not be the same for both coils 30, 32.

FIG. 2 illustrates the economizer 40 in accordance with one non-limiting aspect of the present invention. The economizer 40 may include positive and negative nodes (terminals) 42, 44 configured to electrically connect to corresponding positive and negative nodes of a voltage source 46. The voltage source may be a lower voltage, DC source configured to output approximately 12 VDC, such as but not limited to a conventional, low voltage battery commonly found in automobiles (i.e., battery in the vehicle other than the high voltage battery), a converter, or other device sufficiently configured to power the economizer in the manner contemplated by the present invention. Alternatively, the voltage source 46 may be derived from an input control signal such that if at least one control signal is active then voltage becomes available to power the economizer 40 and relay coils 34, 36. The economizer 40 may include one or more switches/FETs 50, 52, 54 to selectively connect the coils 34, 36 across the voltage source 46. A diode 56 or other directionally dependent device may be included to facilitate controlling the direction of current flow and the voltage drop across the coils 34, 36. A resistor (not shown), optionally, may be included in series with the diode 56 to further reduce holding power.

One non-limiting aspect of the present invention particularly contemplates arranging the coils 34, 36 and switches 50, 52, 54 such that the connection of the coils 34, 36 may be selectively controlled with a controller 60. The table shown below illustrates various vehicle control modes.

| Phase | | Transistor State | | | Contactor | |
|---|---|---|---|---|---|---|
| Step | Mode | 50 | 52 | 54 | Pos | Neg |
| 1 | OFF | 0 | 0 | 0 | OFF | OFF |
| 2 | PRECHARGE | 0 | 1 | 1 | OFF | HI |
| 3 | STARTING | 1 | 1 | 1 | HI | HI |
| 4 | CRUISE | 0 | 1 | 0 | LO | LO |
| 5 | OFF | 0 | 0 | 0 | OFF | OFF |

In an 'off' mode where it is desirable to have both relays 30, 32 in the open position, each of the first 50, second 52, and third 54 switches may be deactivated to prevent a voltage drop across any one of the coils 34, 36. In a 'precharge' mode where it is desirable to have the negative relay 32 in the closed position and the positive relay 30 in the open position, the second and third switches 52, 54 may be activated while the first switch 50 is deactivated in order connect the second coil 36 (negative relay) in series with the voltage source 46 while bypassing the first coil 34 (positive relay), resulting in the entire voltage output from the voltage source 46 being across the second coil 36 such that the second coil 36 is exposed to the pull-in voltage. In a 'starting' mode where it is desirable to have both relays 30, 32 in the closed position, each of the switches 50, 52, 54 are activated in order to connect the coils 34, 36 in parallel across the voltage source 46, resulting in the entire voltage output from the voltage source 46 being across both coils 34, 36 such that both coils 34, 36 are exposed to the pull-in voltage. In a 'cruise' mode where it desirable to reduce the current flow through each coil after the corresponding relays 30, 32 have been closed, the first and third switches 50, 54 are deactivated while the second switch 52 is activated in order to connect the coils 34, 36 in series across the voltage source 46, resulting in approximately half the voltage output from the voltage source 46 (less the voltage drop across the diode 56 and/or resistor) being across both coils 34, 36 such that both coils 34, 36 are exposed to the holding voltage.

The economizer 40 may include additional switches to facilitate selectively connecting the resistor (or more than one resistor) in series with the coils and diode 56 when the coils 34, 36 are connected in series, which may be done to decrease the voltage exposure of the coils. These switches may also be used in place of the diode 56 to control current flow in a manner similar to the diode 56. Optionally, the economizer 40 may include additional coils and switches, such as if an additional relay is to be controlled in a like manner. The additional coil(s) and switches may be suitably arranged with the illustrated coils and switches such that each of the coils can be controllably connected in series and in parallel with the voltage source.

While the economizer 40 described above relies upon multiple switching devices to controllably connect the coils in series and in parallel with the voltage source, the economizer 40 may be configured differently to support delivery of the holding and pull-in voltages. The economizer 40 may be arranged in a cutthroat configuration where two coils are assigned to each relay such that each relay includes a group of two coils for a total of at least four coils. Such a dual-coil arrangement may rely on both coils in each group to pull-in the relays, and thereafter, a single coil from each group to maintain the relays in the closed position. The economizer may also be arranged in a pulse width modulation (PWM) configuration wherein the first and second coils are controlled with PWM such that the voltage is provided across the coils at a 100% duty cycle when pull-in is desired and at some lower duty cycle when holding is desired. The illustrated economizer 40 is believed to be preferable over the cutthroat and PWM configuration since the cutthroat configuration requires additional coils and the PWM configuration may generate undesired electromagnetic interferences.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle battery disconnect comprising:

a positive contactor operable between open and closed positions, the positive contactor operable to connect a positive terminal of a high voltage battery to a positive terminal of a traction motor while in the closed position, the positive contactor operable to disconnect the positive terminal of the high voltage battery from the positive terminal of the traction motor while in the open position;

a negative contactor operable between open and closed positions, the negative contactor operable to connect a negative terminal of the high voltage battery to a negative terminal of the traction motor while in the closed position, the negative contactor operable to disconnect the negative terminal of the high voltage battery from the negative terminal of the traction motor while in the open position;

an economizer operable to actuate the positive and negative contactors between the open and closed positions, the economizer having a first coil proximate the positive contactor and a second coil proximate the negative contactor, the first and second coils operable to receive a pull-in voltage to actuate the contactors from the open position to the closed position, the first and second coils operable to receive a holding voltage to maintain the contactors in the closed position, the holding voltage being less than the pull-in voltage; and the economizer having a plurality of switches operable to selectively connect the first and second coils in series and in parallel to a voltage source, the first and second coils being provided with the pull-in voltage when connected in parallel to the voltage source, the first and second coils being provided with the holding voltage when connected in series to the voltage source.

2. The battery disconnect of claim 1 wherein the voltage source includes a positive node and a negative node and a plurality of switches include a first switch, a second switch and a third switch, and wherein the first switch, the second switch, the third switch, the first coil and the second coil each includes a positive end and a negative end; and wherein, the positive end of the first coil and the positive end of the third switch being connected to the positive node, the negative end of the first switch and the negative end of the second switch being connected to the negative node, the negative end of the first coil being connected to the positive end of the first switch, the negative end of the third switch being connected to the positive end of the second coil, the negative end of the second coil being connected to the positive end of the second switch.

3. The battery disconnect of claim 2 further comprising a diode connected in series between the negative end of the first coil and the positive end of the second coil, the diode being a unidirectional device operable to permit current flow from the first to the second coil.

4. The battery disconnect of claim 1 wherein the traction motor is only operable with energy provided by the high voltage battery while both of the positive and negative contactors are closed at the same time, the positive and negative contactors being operable to the closed position at the same time only while the first and second coils are either connected in series or in parallel with the voltage source.

* * * * *